June 25, 1968  E. V. PAINTER ET AL  3,390,218
METHOD OF PLEATING SHEET MATERIALS
Filed Oct. 6, 1964  4 Sheets-Sheet 3
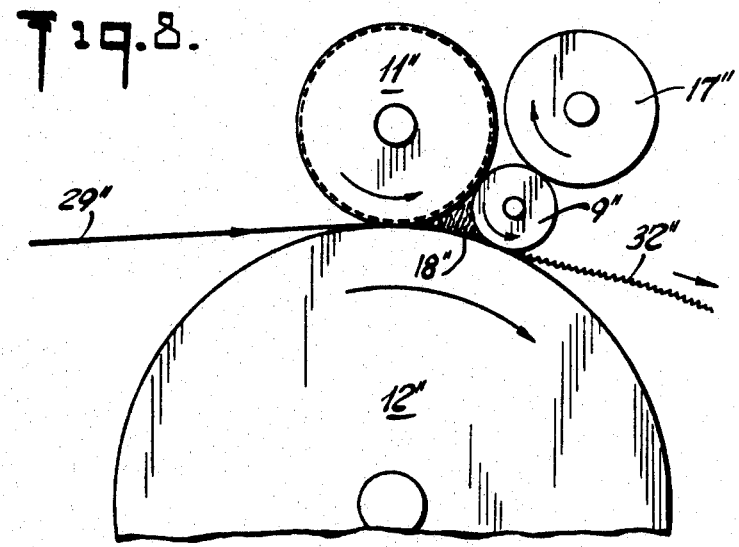
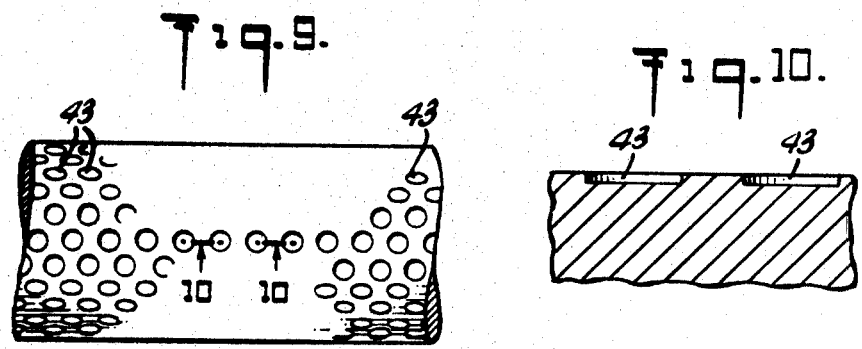
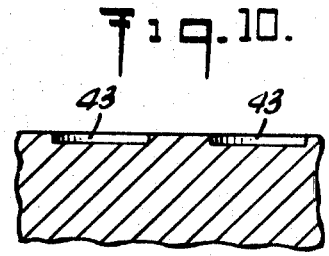
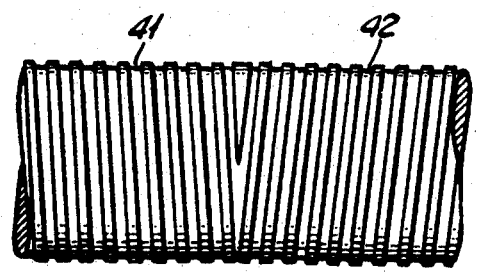
INVENTORS:
ERLE V. PAINTER
FREDERICK K. MESEK
BY ROBERT C. SHEPHERD
ATTORNEY June 25, 1968   E. V. PAINTER ET AL   3,390,218
METHOD OF PLEATING SHEET MATERIALS
Filed Oct. 6, 1964   4 Sheets-Sheet 4
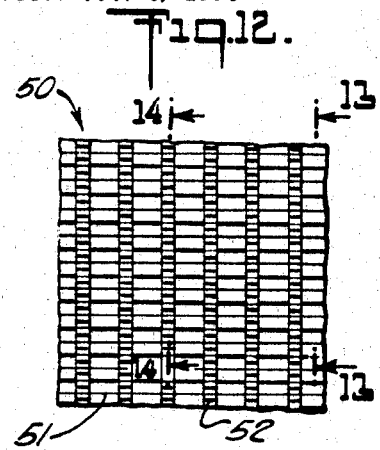
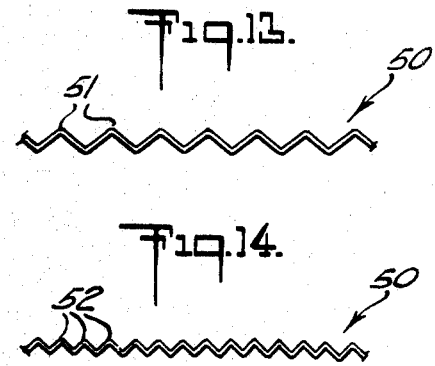
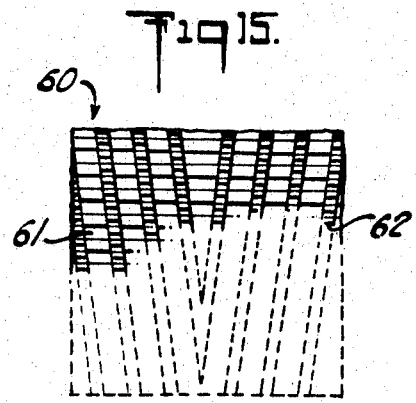
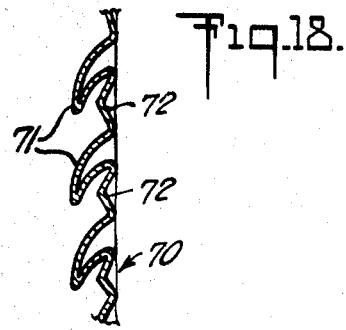
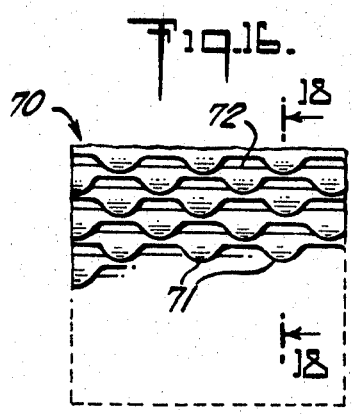
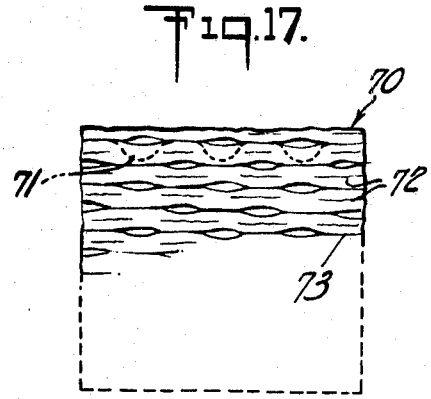
INVENTORS:
ERLE V. PAINTER
FREDERICK K. MESEK
BY ROBERT C. SHEPHERD
Harold L. Warner
ATTORNEY

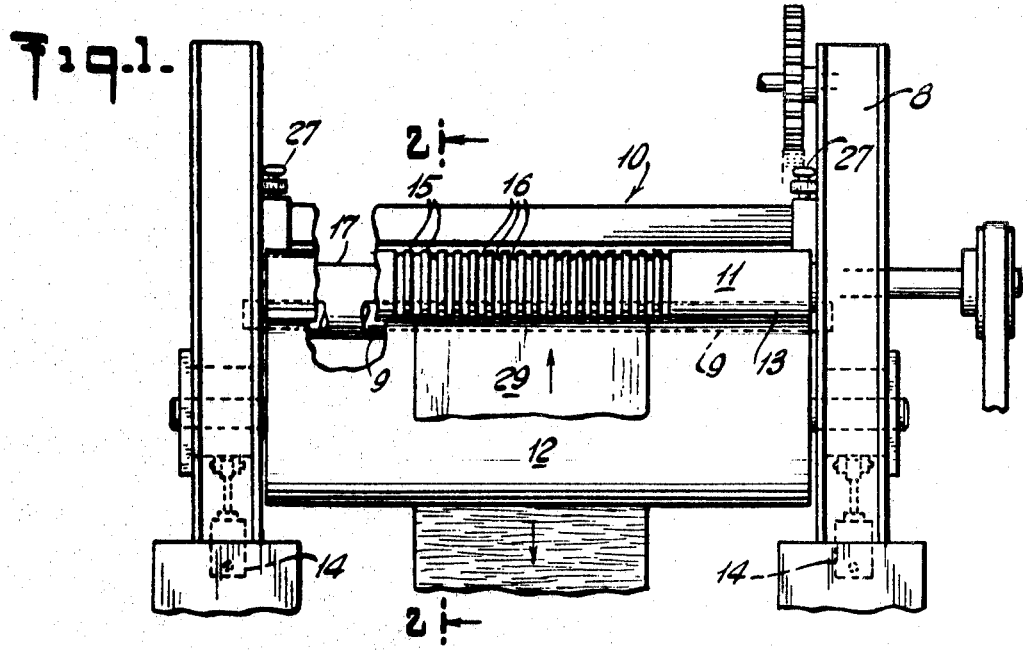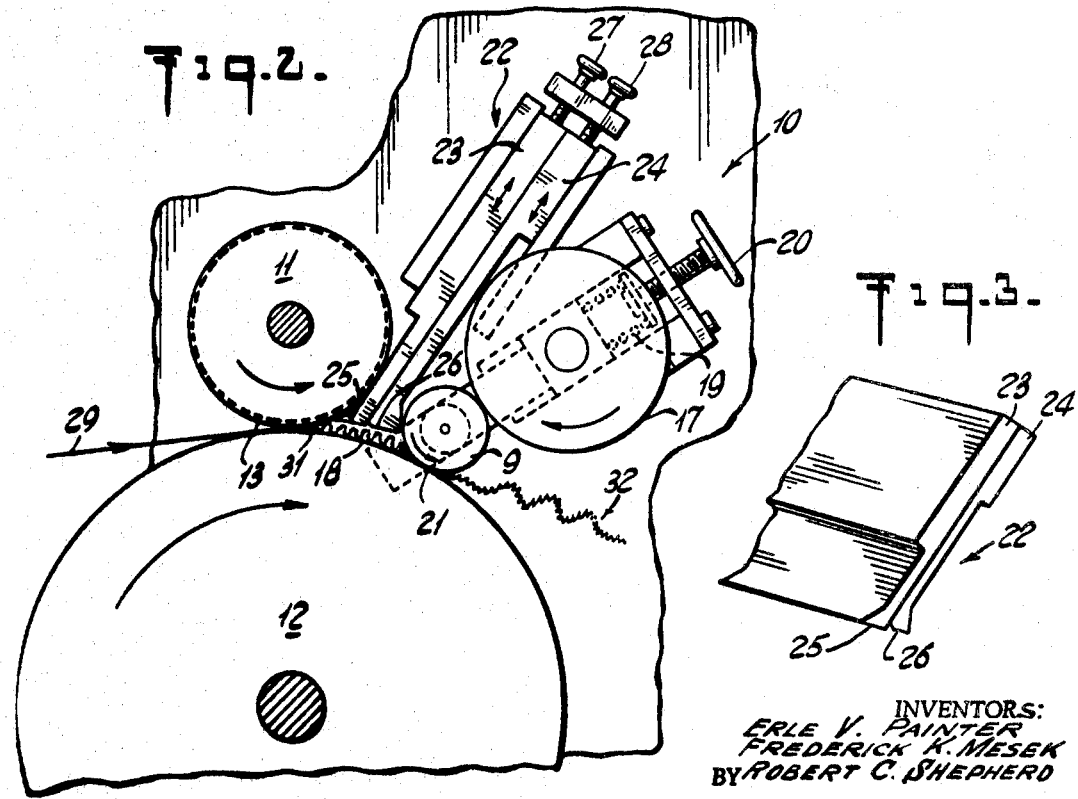

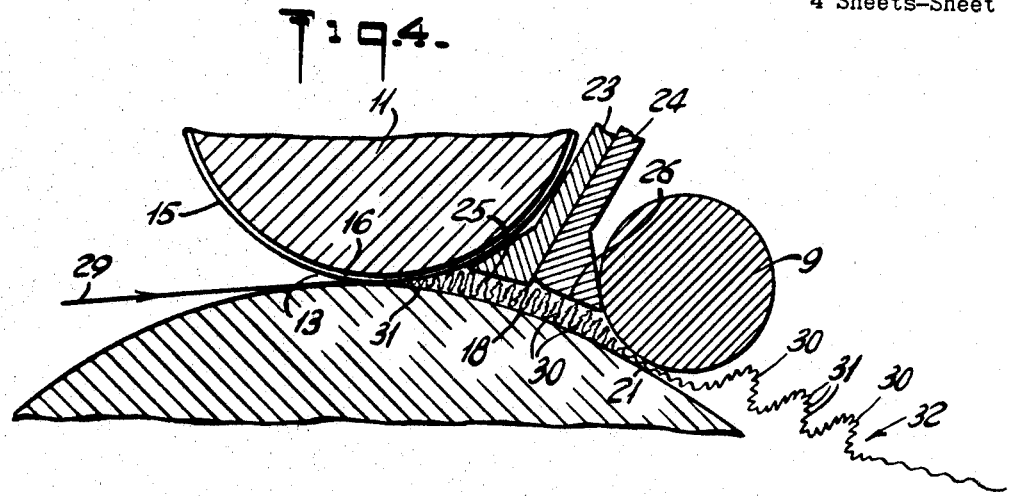
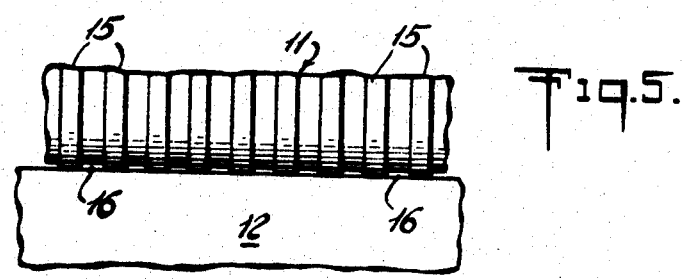
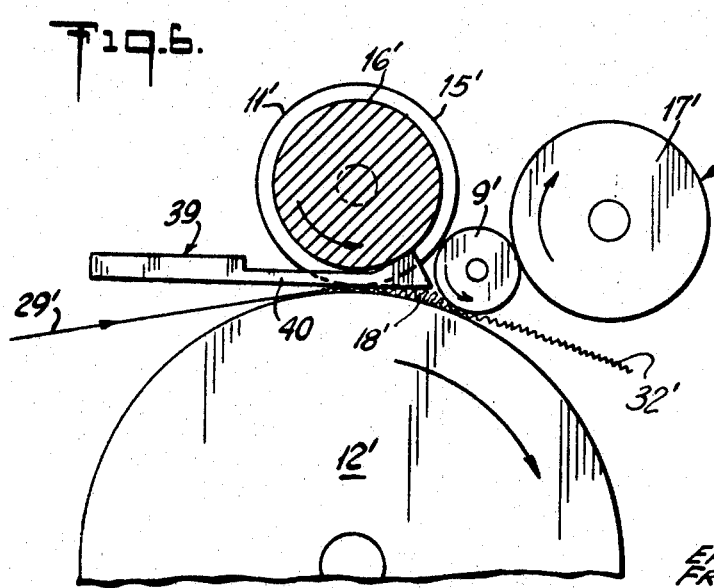
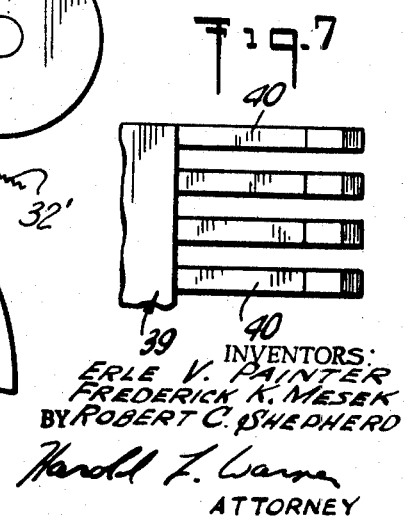

United States Patent Office 3,390,218
Patented June 25, 1968

3,390,218
METHOD OF PLEATING SHEET MATERIALS
Erle V. Painter, La Grange, Frederick K. Mesek, Downers Grove, and Robert C. Shepherd, Oak Lawn, Ill., assignors to Johnson & Johnson, a corporation of New Jersey
Continuation-in-part of application Ser. No. 375,142, June 15, 1964. This application Oct. 6, 1964, Ser. No. 401,838
3 Claims. (Cl. 264—282)

ABSTRACT OF THE DISCLOSURE

A method of mechanically compressing a fibrous sheet to form large and small pleats in a pattern by retarding movement of the fabric. The sheet is passed into the nip of a pair of feed rolls at least one containing an indented pattern. Downstream of the nip the movement of the sheet is retarded thereby forcing a portion of the sheet into the indentation in the feed rolls whereby pleats are formed on the exit side of the nip in a pattern of rows of smaller and larger pleats.

---

The present invention relates to the compacting of flexible sheet materials in the lengthwise direction by forming in the same small crosswise pleats and thus substantially adding to the flexibility and extensibility of the so treated fabric. The invention is directed to apparatus and process for forming such small pleats in various designs so as not only to increase the flexibility and extensibility of the so treated flexible sheet material product but also to add pleasing design patterns to the same. The invention is also directed to extensible flexible fiber products containing such small pleats of varying designs.

This application is a continuation-in-part of my co-pending application Ser. No. 375,142 now abandoned.

It has heretofore been proposed to mechanically compress flexible sheet materials such, for example, as woven and nonwoven fabrics, in the lengthwise direction to form small transverse pleats in the same. By the apparatus and process of the present invention, a wide variety of pleat patterns are obtainable in which a plurality of small pleats, herein referred to as micropleats, of different patterns are formed in the fabric simultaneously as it is passed through the compacting apparatus. In order to more clearly describe the invention reference is made to the accompanying drawings, wherein are set forth by way of illustration and example certain embodiments of this invention.

FIG. 1 is a front view of apparatus embodying the present invention with a portion thereof broken away;

FIG. 2 is a sectional view taken along line 2—2 of FIG. 1;

FIG. 3 is a detailed view showing a portion of the wedge element used in the compactor of FIGS. 1 and 2 shown in section;

FIG. 4 is an enlarged cross sectional detail view of the compression zone of the compactor of FIG. 1;

FIG. 5 is a fragmental detail view of a portion of the feed nip of the compactor of FIG. 1 through which fabric is fed into the compression zone;

FIG. 6 is detail cross sectional view similar to that of FIG. 2 but showing only the roll arrangement of the apparatus and a different form of wedge;

FIG. 7 is a top view of the wedge shown in FIG. 6;

FIG. 8 is a view similar to that of FIG. 2 showing the roll arrangement in compacting apparatus wherein no wedge is used;

FIG. 9 shows a portion of a pleating roll having a different surface pattern than that of the upper pleating roll of FIGS. 1 through 8;

FIG. 10 is an enlarged, detailed sectional view along lines 10—10 of FIG. 9, and FIG. 11 shows a portion of a pleating roll having a still different surface pattern.

FIG. 12 is a section of micropleated fabric after it has been passed through the compactor of FIG. 1, using the pleating roll of FIG. 5;

FIG. 13 is a cross sectional view taken along line 13—13 of FIG. 12;

FIG. 14 is a cross sectional view taken along line 14—14 of FIG. 12.

FIG. 15 is a section of micropleated fabric after it has been passed through the compactor of FIG. 1, using the pleating roll of FIG. 11.

FIG. 16 is a section of micropleated fabric after it has been passed through the compactor of FIG. 1, using the pleating roll of FIG. 9.

FIG. 17 is a view of the reverse side of the section of micropleated fabric of FIG. 16.

FIG. 18 is a cross sectional view of the micropleated fabric of FIG. 16 taken along line 18—18.

In the compactor a compression zone is provided into which fabric is passed from a feed nip formed between two pleating rolls which rotate at approximately the same surface speed. The flexible sheet material on moving into the compression zone is slowed on its exit from the compression zone to a speed substantially less than that at which it is entering. As a result, the fabric fills the compression zone and is forced back up into the nip between the two feed rolls. As the fabric continues to be forced into the compression zone against the back pressure of the fabric forced back into the feed nip it folds back on itself in the form of very small pleats or micropleats. In accordance with the present invention, one of the feed rolls is formed with indentations in its surface, preferably in the form of grooves, as best illustrated in FIGURES 1 and 5 so that when the micropleating occurs on the exit side of the feed nip it occurs in a nonuniform confining area. This results in one type of micropleat being formed at the feed nip in the area of the raised ridges while a different type of micropleat is simultaneously formed at the feed nip in the valley areas. As micropleating does not appear to occur when the apparatus is initially started but only occurs after the compression zone has been filled with fabric so as to force fabric back up into the exit side of the fed nip, and as the pattern of micropleat obtained is changed by the pattern of the roll used, it would seem fairly certain that the actual micropleat formation occurs on the exit side of the feed nip just as the sheet material being micropleated enters the compression zone.

Referring to FIG. 1 and FIG. 2, the compactor or micropleater 10 has a top roll 11 and a bottom roll 12 urged against each other to form a feed nip 13. In the embodiment illustrated, the bottom roll 12 is resiliently urged against the surface of the top roll 11 by means of compressed air from air cylinders 14 which urge the journals in which roll 12 is mounted upwardly to press rolls 11 and 12 together. The invention, however, is not limited to the manner of mounting or driving the rolls and the journals, for bottom roll 12 could, if desired, be kept stationary and top roll 11 be mounted to move towards the bottom roll 12. The surface of top roll 11, shown in detail in FIG. 5, contains a series of circumferential grooves 16 leaving raised ridges 15 between the same. The surface of ridges 15 contact the surface of roll 12 when no flexible sheet material is being fed through feed nip 13. A retarder roll 9 is resiliently urged against the surface of feed roll 12 through a resiliently mounted backup roll 17. As retarder roll 9 is of relatively small diameter so that the same can be positioned relatively close to the feed nip 13, a heavier backup roll such as roll 17 is needed to prevent the same from buckling as pressure is built up in the compression zone 18. The journals of backup roll 17 are resiliently urged by spring members 19 towards retarder roll 9. The journals of retarder roll 9 are slidingly mounted so that the pressure with which the surface of the same is urged against the surface of feed roll 12 is controlled by the compression placed on spring members 19 through screw adjustments 20.

The size of the micropleat can be controlled by varying the pressure at which roll 9 is urged against the surface of roll 12. As the pressure is increased, the size of the micropleat formed is reduced.

In the preferred practice, the roll 12 is heated, as for example by circulating heated fluid therethrough, so as to heat the fabric as the micropleats are being formed and while it is under compression in the compression zone 18.

The compression zone 18 is a confined area between the feed nip 13 through which fabric enters and exit nip 21, formed between the surface of feed roll 12 and retarder roll 9, through which the micropleated fabric leaves the compression zone. Compression zone 18 is bordered by the surfaces of rolls 11, 12, and 9, and may be completely defined by these surfaces as is the situation, for example, in the embodiment illustrated by FIG. 8. However, in the preferred practice, the compression zone is defined on one side by the lower surface of a moveable wedge. In the apparatus illustrated in FIGS. 1 through 4, this wedge 22, illustrated in detail in FIG. 3 is formed in two parts 23 and 24, the lower surfaces 25 and 26 of which form the remainder of the compression zone 18. By varying the position of surfaces 25 and 26, the pattern of pleat can be somewhat further varied. In order to enable movement of these surfaces, the position of wedge sections 23 and 24 is controlled by adjusting screws 27 and 28.

Any conventional drive means may be used for driving the feed rolls 11 and 12 and retarder roll 9. The retarder rlol 9, however, should be driven at a surface speed substantially slower than the surface speeds of rolls 11 and 12, the speed of retarder roll 9 in the preferred practice being about ⅛ that of the surface speeds of rolls 11 and 12.

In the particular modification shown in FIGS. 1–4, the rolls are driven by drive means not shown through a belt which transmits the drive to gear box 8 from which, by conventional drive means to rolls 11 and 17, roll 12 is driven through frictional contact with the surface of roll 11 or through frictional contact with flexible material fed between rolls 11 and 12 through nip 13. The surface of roll 12 travels at substantially the same speed as that of roll 11, but due to the frictional drive in actual practice is slightly slower. Both rolls 11 and 12 may be positively driven to assure the same surface speed if desired. Retarder roll 9 is driven through frictional contact with the surface of backup roll 17 which in turn is positively driven through gear train not shown which obtains its drive from the drive means transmitted through the belt.

Referring now to FIG. 4, flexible sheet material 29, such as a continuous sheet of nonwoven fabric, is fed into the compactor through feed nip 13 between rolls 11 and 12. Initially the fabric is started through the exit nip 21 between rolls 12 and 9. As the apparatus is operated, the passage of the fabric through the compression zone 18 is substantially slower than its entry into the compression zone because of the substantially slower speed at which retarder roll 9 rotates. This results in the fabric folding back on itself forming relatively large pleats 30 which soon fill up the compression zone with the result that the fabric is forced back on itself into exit side of feed nip 13 as it enters the compression zone. This forcing of the fabric back into the exit side of feed nip 13 results in an extremely fine pleat, herein called a micropleat, being formed between the surfaces of rolls 11 and 12 at the nip 13. These micropleats 31, formed at nip 13, are shown somewhat enlarged with respect to large pleats 30 in the fabric 32 as it leaves the exit nip 21.

In FIG. 6 is shown schematically apparatus similar to that of FIGS. 1 through 5, the main difference being in the wedge used to form one side of the compression zone 18'. The wedge 39 contains a plurality of fingers 40 which fit in the grooves 16' between the ridges 15' of roll 11'. As these fingers 40 substantially fill the grooves 16' they substantially effect the micropleat pattern obtained. Also by slightly adjusting the position of the wedge with resulting shifting of the fingers the micropleat pattern can be varied as this also changes slightly the surface of the nip area in which the micropleat formation occurs.

The particular wedge design illustrated in FIGS. 6 and 7 of the drawings is suitable, however, only with a roll having an indentation pattern such as that illustrated in FIGS. 1 and 5. As previously indicated, other patterns may be used such, for example, as that illustrated in FIGS. 9 and 10, and that illustrated in FIG. 11. With patterns such as these, the particular wedge used in the modification shown in FIGS. 6 and 7 could not be employed.

In the apparatus illustrated schematically in FIG. 8, the compression zone 18" is completely enclosed by the surfaces of rolls 11", 12" and retarding roll 9". In this particular modification, no wedge is used to form one surface of the confining zone 18". Where no wedge is used, however, the micropleated product obtained is not uniform as there is a periodic buildup and then ejection from the compression zone 18". However, micropleating does occur and where a nonuniform product is desired, that is one which has a cyclic pattern, the apparatus may be used.

In FIGS. 12, 13, and 14, there is illustrated a swatch of nonwoven fabric 50 that has been micropleated with the apparatus such as illustrated in FIGS. 1 through 5; wherein pleating roll 11, illustrated in FIG. 5, having circumferential grooves 16 and ridges 15, is used. The micropleated fabric 50 can be seen to contain a plurality of small discontinuous pleats extending across the width of the fabric. These pleats are made up of a series of very small pleats 52, separated by slightly larger pleats 51, which appear to be alternately raised on one side and lowered on the other to give a corduroy-like appearance to the fabric. The pattern is repeated throughout the length of the fabric so that rows of small pleats 52 and rows of slightly larger pleats 51 are arranged in separate lines extending lengthwise of the fabric. Both very small pleats 52 and slightly larger pleats 51 are represented in the schematic diagram of FIG. 4 by micropleats 31.

The very small pleats 52 are better illustrated in FIG. 14, which is a cross section taken along line 14—14 of FIG. 12; and where the same are substantially enlarged for the purpose of illustration. The somewhat larger pleats 51, having substantially the same shape as the very small pleats 52, but having a somewhat greater amplitude, are better illustrated in FIG. 13 which is a cross sectional view along line 13—13 of FIG. 12, the same again being enlarged for purposes of illustration. This pattern of alternating pleats of different size extending across the fabric not only gives the fabric an aesthetic appearance, but substantially improves the drape in the crosswise direction without interfering with the extensibility imparted to it through the formation of the pleats.

In FIG. 15 there is illustrated a swatch of nonwoven fabric 60 similar to that used in making the fabric of FIG. 12 that has been micropleated with the apparatus as illustrated in FIGS. 1 through 5, wherein the embossed pleating roll of FIG. 11 is used. The resulting micropleated fabric 60 will be seen to again contain a plurality of small discontinuous pleats extending across the width of the fabric. These pleats are made up of a series of very small pleats 62 separated by slightly larger pleats 61 having substantially the same shape and amplitude as the pleats in the fabric of FIGS. 12 through 14. Where, in the fabric of FIG. 12, the micropleats were disposed in rows parallel to the axis of primary extension; the micropleats here are arranged in rows which, extending lengthwise of the fabric, slant toward and intersect at the axis of primary extension.

A micropleated nonwoven fabric 70 that has been micropleated with the pleating roll illustrated in FIGS. 9 and 10, which contains on its surface a plurality of shallow circular depressions 43, is illustrated in FIGS. 16 through 18. The small discontinuous pleats extending across the width of the micropleated fabric 70 contain a series of pocket-like pleats 71, surrounded by smaller pleats 72 interposed between the larger pocket-like pleats 71. The pocket-like pleats 71 and the smaller pleats 72 alternate across the width of the fabric and along its length. The smaller pleats 72 are contained along the length of the fabric at a greater frequency than the larger pocket-like pleats 71. The pattern of alternating smaller pleats 72 and larger pocket-like pleats 71 is substantially repeated across the fabric and along the length of the fabric.

The pattern on the reverse side of the swatch of material illustrated in FIG. 16 is illustrated in FIG. 18. Here the pocket-like pleats are not as pronounced but appear to be superimposed on a pattern of rib-like pleats 73 that appear to extend across the fabric. This is probably due to the fact that only roll 11 is embossed in the compactor of FIG. 1.

Other patterned rolls may be used in place of the particular pattern rolls illustrated in FIGS. 5, 9, and 11; thereby obtaining various and different eye-pleasing patterns of pleats. The appearance of the micropleated product will also depend somewhat on the particular type of fabric being micropleated, and its thickness. However, in each instance, a pattern will be obtained wherein the pleats extending across the fabric will vary in size, larger pleats being separated by smaller pleats to give a more drapable product.

Particular embodiments of the invention have been used to illustrate the same. The invention, however, is not limited to these specific embodiments. In view of the foregoing disclosure variations or modifications thereof will be apparent, and it is intended to include within the inveniton all such variations and modifications except as do not come within the scope of the appended claims.

What is claimed is:

1. The method of mechanically compressing a flexible fibrous sheet to form a pattern of pleats in the same wherein the pleats extend discontinuously across the fabric and rows of smaller pleats regularly alternate with rows of larger pleats, comprising: (1) passing a portion of a flexible fibrous sheet through a nip formed by a pair of rotating feed rolls, at least one of which contains an indented surface pattern, and (2) while feeding said sheet through said nip, retarding the movement of said sheet away from said nip by exerting substantial pressure on a portion of said fibrous sheet on the exit side of said nip toward the nip to force a portion of said sheet leaving said nip against the exit side of said nip and into the indentations forming said indented surface pattern of said roll, whereby pleats are formed on the exit side of the nip.

2. The method of claim 1 in which said sheet is maintained in a tightly pressed state after said pleats are formed therein while the same is heated and then passed through a pair of pressure rolls.

3. The process of claim 2 in which said flexible fibrous sheet material is heated as said small pleats are formed.

References Cited

UNITED STATES PATENTS

| | | | |
|---|---|---|---|
| 2,263,712 | 11/1941 | Wrigley | 264—282 |
| 2,668,573 | 2/1954 | Larsson | 264—286 |
| 2,774,525 | 12/1956 | Angevine | 223—32 |
| 3,059,313 | 10/1962 | Harmon | 264—282 |
| 3,235,933 | 2/1966 | Catallo | 264—282 |
| 3,236,718 | 2/1966 | Conn | 161—128 |
| 3,260,778 | 7/1966 | Walton | 264—282 |

FOREIGN PATENTS 642,522   6/1962   Canada.

ROBERT F. WHITE, *Primary Examiner.*

R. R. KUCIA, *Assistant Examiner.*